| United States Patent [19] | [11] | 4,347,123 |
|---|---|---|
| Mauldin et al. | [45] | Aug. 31, 1982 |

[54] REFORMING WITH MULTIMETALLIC CATALYSTS

[75] Inventors: Charles H. Mauldin; William C. Baird, Jr., both of Baton Rouge, La.

[73] Assignee: Exxon Research & Engineering Co., Florham Park, N.J.

[21] Appl. No.: 146,381

[22] Filed: May 5, 1980

[51] Int. Cl.³ .............................................. C10G 35/06
[52] U.S. Cl. .................................... 208/136; 252/439; 585/421
[58] Field of Search ......................... 585/421; 208/136

[56] References Cited

U.S. PATENT DOCUMENTS

| 2,632,739 | 3/1953 | Dinwiddie et al. | 252/465 |
|---|---|---|---|
| 2,692,847 | 10/1954 | Rex . | |
| 2,754,345 | 7/1956 | Kirshenbaum | 585/379 |
| 2,918,422 | 12/1959 | Evering et al. | 208/79 |
| 2,967,822 | 1/1961 | Moy et al. | 208/136 |
| 3,001,930 | 9/1961 | White et al. | 208/136 |
| 3,114,697 | 12/1963 | Bourne et al. | 208/136 |
| 3,202,725 | 8/1965 | Lorz et al. | 585/421 |
| 4,151,071 | 4/1979 | Myers | 208/135 |

*Primary Examiner*—Curtis R. Davis
*Attorney, Agent, or Firm*—Llewellyn A. Proctor

[57] ABSTRACT

A catalyst constituted of a Group VI-B metal, especially chromium and molybdenum, composited with an inorganic oxide support, notably alumina, neutralized; and the use of such catalyst in reforming naphthas of high olefin content, particularly non-hydrofined olefinic naphthas which contain high concentrations of nitrogen and sulfur.

12 Claims, No Drawings

REFORMING WITH MULTIMETALLIC CATALYSTS

BACKGROUND OF THE INVENTION AND PRIOR ART

Catalytic reforming (hydroforming) is a process well known to the petroleum refining industry for improving the octane quality of naphthas and straight run gasolines. The process is also a net producer of hydrogen, though hydrogen is used in the process. In a typical process, a series of reactors are provided with fixed beds of catalyst which receive a preheated upflow or downflow feed because the reactions which take place are endothermic. A naphtha feed, with hydrogen, usually as a recycle gas, is co-currently passed sequentially through a reheat furnace and then to the next reactor of the series. The vapor effluent from the last reactor of the series is a gas rich in hydrogen, which usually contains small amounts of normally gaseous hydrocarbons, from which hydrogen is separated from the $C_5+$ liquid product and recycled to the process to minimize coke production; coke invariably forming and depositing on the catalyst during the reaction.

Reforming catalysts are recognized as dual functional, the catalyst composite including a metal, or metals, or a compound or compounds thereof, providing a hydrogenation-dehydrogenation (hydrogen transfer) function and an acidic component providing an isomerization function. In recent years, the platinum group metals (ruthenium, osmium, rhodium, iridium, palladium and platinum), particularly platinum used alone or in combination with other metals have been widely used in commercial reforming operations, this metal, or metals being composited with an inorganic oxide base, particularly alumina; and halogen, chlorine, have generally been added to the composite to provide the required acid function. The noble metal catalysts replaced an older generation of reforming catalysts comprised of non-noble metals, e.g., molybdenum and/or chromium-alumina catalysts, because of their higher activity, selectivity and activity maintenance; albeit the earlier generation catalysts were recognized as having considerably higher tolerance to nitrogen and sulfur.

The principal reactions produced in reforming are dehydrogenation of naphthenes to produce the corresponding aromatic hydrocarbons; isomerization of n-paraffins to form branched-chain paraffins and isomerization of ring compounds, and dehydrogenation of the latter to form aromatics; dehydrocyclization of paraffins to form aromatics; and hydrocracking of high molecular weight feed constituents to form lower molecular weight, or lower boiling, constituents, the net effect of these reactions being to increase the concentration of aromatics and isomers, with consequent octane improvement of naphthas boiling within the gasoline range. Ideally therefore, a typical feed for use in a reforming unit should be one high in naphthenes and paraffins, with a minimum of olefins, if any. Reforming feeds accordingly, are paraffinic naphthas, especially virgin naphthas, which are highly hydrofined prior to their use in a reforming unit to reduce their nitrogen, sulfur and olefin contents.

Present-day conditions, however, require the reforming of naphthas derived from synthetic hydrocarbon sources, viz. gas oil, residua, shale oil and coal. These naphthas are highly unsaturated and contain considerably more sulfur, nitrogen, olefins, and condensed ring compounds than the more conventional naphthas. For example, nitrogen and sulfur are contained in cat naphtha in concentrations ranging upwardly from 50 ppm and 1000 ppm, respectively. In coal liquids nitrogen and sulfur are present in concentrations ranging upwardly of 1300 ppm and 5000 ppm, respectively; and oxygen is presently in even higher concentrations. These compounds cause activity suppression and an all too rapid deactivation of noble metal catalysts. Coke formation is increased, and there is more cracking with increased gas production. Albeit these compounds, except for condensed ring naphthenic compounds, can be removed by conventional hydrofining, this is a severe, if not an intolerable process burden due to the large hydrogen consumption; and hydrogen becomes more and more a very expensive commodity. Even under the best of circumstances only about three-fourths of the hydrogen consumed in hydrofining can be recovered in conventional reforming, and the energy consumed in the hydrogenation and dehydrogenation reactions can never be recovered.

Naphtha derived from coal liquids, were it not for the presence of the high heteroatom and olefin contents, could constitute a valuable source of reformer feed. Such naphtha contains large amounts of $C_6$ naphthenes, often up to 45 percent. In terms of aromatics formation this feed is relatively easy to convert since only carbon-hydrogen (C—H) bond breaking ability is required, carbon-carbon (C—C) bond formation being unnecessary. Cat cracker naphtha too, though somewhat more difficult to reform because more dehydrocyclization is required, could constitute a valuable feed source. Because of the substantial olefin content of this feed it is both thermodynamically more favorable and kinetically faster to dehydrocyclize olefins than paraffins. Moreover, its higher aromatic and branched paraffin content contribute to an already good octane number. The octane number of cat naphtha prior to olefin saturation is about 90, and it is greater than 70 after olefin saturation.

It is primarily the objective of the present invention to obviate these and other prior art deficiencies, particularly by providing new and improved catalysts, and a process for utilizing such catalysts for upgrading unsaturated olefinic anphthas, especially non-hydrofined olefinic naphthas derived from synthetic fuels, by reforming to produce higher octane gasolines.

A particular object is to provide a new and improved reforming process for effecting, at suitable reforming conditions, the production of high octane gasolines from naphthas derived from the cracking or coking of heavy hydrocarbon feedstocks, such as gas oil, residua, shale oil, coal liquids and the like.

A more particular object is to provide a process, as characterized, which can be used to process reforming feedstocks which contain significantly high concentrations of sulfur, nitrogen, olefins and condensed naphthene relative to virgin naphthas, and which, at conventional reforming conditions provide increased aromatics formation at low coking rates.

These and other objects are achieved in accordance with the present invention embodying a non-acidic catalyst, or catalyst comprised of a Group VI-B metal, especially chromium and molybdenum, composited with an inorganic oxide support, notably alumina, the Bronsted acidity of the composite of which is neutralized; and the use of such catalyst in reforming naphthas of high olefin content, particularly non-hydrofined olefinic naphthas which contain high concentrations of nitrogen and sulfur.

The Group VI-B metal (Periodic Table of the Elements; Sargent-Welch Scientific Company, Copyright 1968) catalysts, notably chromium and molybdenum containing catalysts, can be promoted, or treated and the Bronsted acidity thereof neutralized, as by contact with a solution, or slurry containing an alkali or alkaline-earth metal compound, or salt, and the non-acidic, deacidified or neutralized catalyst then used to advantage in reforming these new reforming feedstocks, supra. For example, chromia-alumina or molybdena-alumina catalysts can be treated by contact with an aqueous solution of a Group I-A or Group II-A metal carbonate, bicarbonate, or hyroxide, especially solutions which contain salts or hydroxides of sodium, potassium or cesium, especially carbonates, to neutralize, or deacidify the Bronsted acidity of the Group VI-B metal containing composite. The non-acidic or neutralized catalyst, the alkali or alkaline-earth metal of which is dispersed substantially entirely on the surface of the catalyst composite, is then conventionally dried, or calcined, or both, and used in reforming. Neutralized, chromia catalysts are found to be much more tolerant of the significantly higher nitrogen, sulfur, olefin and condensed naphthene components of the new feeds, particularly cat naphthas and coal naphthas, and promote higher aromatization activity and lessened coke production than noble metal, or non-neutralized non-noble metal catalysts. Similarly, neutralized, molybdena-alumina catalysts have been found to have improved stability, with lesser gas and coke yields in reforming these new feedstocks than noble metal, or non-neutralized non-noble metal catalysts.

In its preferred aspects, the catalyst is comprised of a Group VI-B metal composited with an inorganic oxide support to which a small concentration of a Group I-A or Group II-A metal is added during the neutralization to increase the ability of the catalyst to form aromatics, lower the rate of coke formation and improve the stability of the catalyst in reforming, as contrasted with a noble metal catalyst; or a non-noble metal catalyst, or catalyst otherwise similar except that the catalyst has not been neutralized.

The catalyst is one which contains a Group VI-B metal as an essential component, generally in concentration ranging from about 0.1 percent to about 20 percent, preferably from about 1 percent to about 10 percent, based on the weight of the catalyst (dry basis). The catalyst also contains a Group I-A or II-A metal as an essential component, generally in concentration ranging from about 0.1 percent to about 4 percent, preferably from about 0.1 percent to about 2 percent, based on the weight of the catalyst (dry basis).

It is known that noble metal reforming catalyst, notably platinum metal reforming catalysts, require substantial acidity for optimum catalytic activity, and that the required acidity is normally imparted by the addition of a halide to the catalyst. The acidity is required to isomerize the $C_5$ naphthenes present in the feed or produced as intermediates by platinum catalyzed dehydrocyclization to produce $C_6$ naphthenes, which are subsequently aromatized by dehydrogenation. In the absence of this acidity rapid deactivation of the catalyst occurs as a consequence of the coking tendency possessed by the $C_5$ naphthenes. Acidity however, is an undesirable catalyst feature in accordance with the present invention because of its tendency to cause the olefins to crack to light gas, which lowers yield, and polymerize to coke-like material, which increases catalyst deactivation. Moreover, alkyl indanes and condensed naphthenes are present to a larger extent in these types of feed as contrasted with conventional virgin naphthas, and there is evidence that suggests that indane and indane-like hydrocarbons are powerful activity suppressors and, possibly, coke precursors on the more conventional catalysts. Whether this effect is one of simple competitive absorption or polymerization to coke via an indene intermediate is not known, but whatever the mechanism it is strongly believed that problems with indane homologs are in part a result of an interaction with the acidic support.

The catalysts of this invention, unlike conventional catalysts, thus do not rely on acidity for optimum dehydrocyclization acitivity. The aromatization of paraffins and olefins proceeds through step-wise dehydrogenation to a triene which thermally (or catalytically) cyclizes to a cyclohexadiene, further dehydrogenation forming the aromatic, infra.

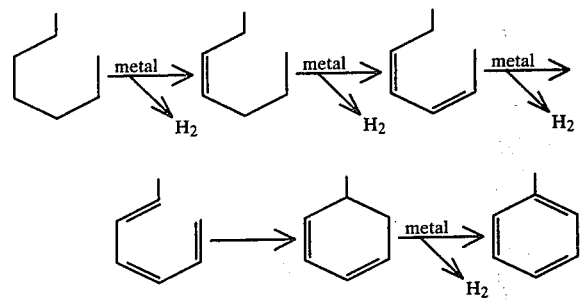

Acidity is thus not involved in this type of aromatization and in fact is harmful because of the unsaturated intermediates. This mechanistic pathway thus has the advantage of providing a much simpler surface reaction compared to the dehydrocyclization mechanism of noble metals, which is very surface sensitive and requires specific metal crystallite size.

Sulfur may be a catalyst component, the sulfur content of the catalyst generally ranging to about 7.0 percent, preferably from about 0.05 percent to about 2.0 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures ranging from about 350° F. to about 1050° F. and pressures ranging about 1 to about 40 atmospheres for the time necessary to achieve breakthrough, or the desired sulfur level.

The components of the catalyst are composited with a refractory inorganic oxide support material, particularly alumina. Suitably, the metals constituting the hydrogenation-dehydrogenation component can be separately added to the support, or added simultaneously. The most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 $m^2$/g., preferably from about 100 to about 300 $m^2$/g., a bulk density of about 0.3 to 1.0 g/ml, preferably about 0.4 to 0.8 g/ml, an average pore volume of about 0.2 to 1.1 ml/g., preferably about 0.3 to 0.8 ml/g., and an average pore diameter of about 30 to about 300 A.

Catalysts comprising lower purity alumina that already contains sodium in the bulk are also promoted by alkali treatment. Alkali or alkaline earth metal treatment can be before or after any type of conventional catalyst pre-treatment such as calcination, sulfiding, or reduction. The improved catalysts are particularly suited for use in a fluid bed reforming process or a magnetically stabilized fluid bed process, and can be applied to dehydrogenation processes generally.

The metals constituting the hydrogenation-dehydrogenation component can be composited or intimately associated with the porous inorganic oxide support or carrier by various techniques known to the art such as ion-exchange, coprecipitation with the alumina in the sol or gel form, and the like. For example, the catalyst composite can be formed by adding together suitable reagents such as salts of the required metals and ammonium hydroxide or ammonium carbonate, and a salt of aluminum such as aluminum chloride or aluminum sulfate to form aluminum hydroxide. The aluminum hydroxide containing the salts an then be neutralized by treatment with the alkali or alkaline-earth, heated, dried, formed into pellets or extruded, and then calcined in nitrogen or other non-agglomerating atmosphere. The metals hydrogenation-dehydeogenation component is preferably added to the catalyst by impregnation, typically via an "incipient wetness" technique which requires a minimum of solution so that the total solution is absorbed, initially or after some evaporation.

Suitably, the metals hydrogenation-dehydrogenation component is deposited on a previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components.

In compositing the metals with the support, essentially any soluble compound of the respective metal can be used, but a soluble compound which can be easily subjected to thermal decomposition and reduction is preferred, for example, inorganic salts such as carbonates, bicarbonates, nitrates, inorganic complex compounds, or organic salts such as a complex salt of acetylacetone, an amine salt, or the like.

The impregnation of the Group VI-B metal, or metals components into a support is carried out by impregnating the support with a solution, or solutions, of the respective salts or compounds of the elements or metals to be incorporated. Salts, acids or compounds of each metal can be dissolved in a solution, or the salts, acids or compounds can be separately dissolved in solutions, the solutions admixed, and the admixed solution used for impregnation of the support. The amount of impregnation solution used should be sufficient to completely immerse the support, usually within the range from about 1 to 20 times of the support by volume, depending on the metal concentration in the impregnation solution.

The impregnation treatment can be carried out under a wide range of conditions including ambient or elevated temperatures and atmospheric or superatmospheric pressures.

The catalyst, after impregnation, is neutralized, and then dried by heating at a temperature above about 80° F., preferably between about 150° F. and 300° F., in the presence of an inert or non reactive gas, or under vacuum. The catalyst is calcined at a temperature between about 500° F. to 1200° F., preferably about 500° F. to 1050° F., suitably in the presence of a gas such a nitrogen, or air.

The catalyst can be activated by contact with an inert gas or air at tempertures ranging from about 500° F. to about 1050° F. for periods ranging from about 1 to about 24 hours at either flowing or static conditions. Reduction is performed by contacting the catalyst with flowing hydrogen at temperatures ranging from about 350° F. to about 1050° F. for periods ranging from about 0.5 to about 24 hours at pressures ranging from about 1 to about 40 atm. The catalyst can be sulfided by use of a hydrogen-hydrogen sulfide blend and the sulfiding is performed at temperatures ranging from about 350° F. to about 1050° F. at pressures ranging about 1–40 atm. for a time necessary to achieve breakthrough, or the desired sulfur level. Post-sulfiding stripping can be employed if desired at conditions similar to those for reduction of the catalyst.

This catalyst is particularly useful in conducting semi-cyclic or cyclic reforming operations. The production of a high octane product is favored, and the catalyst suppresses coke formation which tends to cause catalyst deactivation. The catalyst is particularly useful at low presures, or pressures ranging from about 0 psig to about 150 psig, where maximum yield is favored.

The feed or charge stock can be a coker naphtha, coal naphtha, shale naphtha, tar sands naphtha, virgin naphtha, cracked naphtha, a Fischer-Tropsch naphtha, or the like. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 20 to about 80 Vol.% parafins and/or olefins, both normal and branched, which fall in the range of about $C_5$ to $C_{12}$, from about 10 to 80 Vol.% of saturated and unsaturated naphthenes falling within the range of from about $C_6$ to $C_{12}$, and from 5 through 20 Vol.% of the desirable aromatics falling within the range of from about $C_6$ to $C_{12}$. These naphthas may or may not be hydrotreated to various degrees and consequently may or may not contain hereroatom impurities, such as sulfur, nitrogen, oxygen, or arsenic, in concentrations ranging up to several thousand ppm.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
|---|---|---|
| Pressure, Psig | 0–200 | 0–100 |
| Reactor Temp., °F. | 750–1200 | 850–1100 |

| Major Operating Variables | Typical Process Conditions | Preferred Process Conditions |
|---|---|---|
| Gas Rate, SCF/B (Incl. Recycle Gas) | 0–5000 | 0–3000 |
| Feed Rate, W/W/Hr | 0.5–10 | 1.3 |

The invention will be more fully understood by reference to the following demonstrations and examples which present comparative data illustrating its more salient features. All parts are given in terms of weight except as otherwise specified.

EXAMPLES

Catalysts were prepard by impregnating high purity alumina with certain Group VI-B metal compounds contained in aqueous solution, drying and calcining in air. The catalysts were sulfided at 930° F. with an admixture of hydrogen sulfide and hydrogen ($H_2S$ in $H_2$), and portions of the catalysts then treated by immersion in a one molar solution of an alkali or alkaline earth metal salt, or hydroxide solution for one hour, filtered, washed with water and dried. This procedure results in the deposition the alkali or alkaline earth metal on the acidic sites of both the Group VI-B metal and alumina surfaces. The aromatization activity was tested using 1-heptene as a model feed for cat naphtha; the test being done in the absence of added hydrogen to increase the severity of the tests.

In Table I there is listed the results obtained by impregnating chromic acid onto high purity, acidic alumina. Portions of this catalyst were treated after calcining with aqueous solutions of various carbonate and hydroxide bases as listed in said table. The base is deposited on the acidic sites which was found critical in increasing activity and reducing coke formation. Table II demonstrates reforming runs which compare the effectiveness of catalysts impregnated with potassium nitrate vis-a-vis neutralization with potassium carbonate. In the operating runs, given in Table II, nitrogen was used as a diluent gas in the feed introduced into the reformer.

TABLE I
HEPTENE REFORMING ON PROMOTED CHROMIA CATALYSTS
1 Atm. 930° F. 1.0 W/H/W $N_2$/Oil ~37

| Base Used | Wt. % Cr | Wt. % Promoter | Wt. % Toluene Yield 5 Min. | 1 hr. | 2 hr. | 4 hr. | Wt. % Coke @ 5 Hrs. |
|---|---|---|---|---|---|---|---|
| $K_2CO_3$ | 1.85 | 1.02 K | 71 | 51 | 38 | 25 | 3.86 |
| $Na_2CO_3$ | 2.78 | 0.37 Na | 67 | 45 | 34 | 21 | 3.11 |
| $Cs_2CO_3$ | 2.97 | 1.66 Cs | 58 | 46 | 34 | 21 | N.A. |
| $Ca(OH)_2$ | 2.97 | 0.07 Ca | 58 | 33 | 26 | 17 | 4.23 |
| $Ba(OH)_2$ | 4.01 | 0.77 Ba | 44 | 27 | 22 | 15 | 4.94 |
| $Li_2CO_3$ | 2.73 | 0.004 Li | 37 | 27 | 20 | 13 | 4.71 |
| None | 3.79 | None | 50 | 27 | 20 | 13 | 6.63 |

TABLE II
NITRATE VERSUS CARBONATE PROMOTION
Heptene Reforming
1 Atm. 930° F. 1.0 W/H/W $N_2$/Oil ~37

| Promoter | Wt. % Cr | Wt. % K | Wt. % Toluene Yield 5 Min. | 1 hr. | 2 hr. | 4 hr. | Wt. % Coke @ 5 Hrs. |
|---|---|---|---|---|---|---|---|
| $K_2CO_3$ | 1.85 | 1.02 | 71 | 51 | 38 | 25 | 3.86 |
| $KNO_3$ | 5.0 | 0.5 | 78 | 43 | 32 | 21 | 5.50 |
| $KNO_3$/ $K_2CO_3$ | 2.4 | 0.87 | — | 48 | 38 | 25 | 2.26 |

These data show that potassium, sodium, and cesium are particularly effective in promoting aromatization and give the lowest coke. The neutralized catalysts are especially effective in view of the lower chromium content compared to the parent catalyst. Lithium, calcium, and barium are less effective.

Potassium was known prior to this invention to be a promoter for chromia catalysts. However, previous use of potassium involved incorporation of $KNO_3$ during impregnation. It was discovered that potassium is far more effective when added as a post-impregnation carbonate neutralization rather than nitrate impregnation. From these data it is shown that doping the surface of the catalyst is far more effective in improving activity than dispersing the promoter throughout the chomia phase. The data given in Table II shows the greater promotional effect of $K_2CO_3$ compared with $KNO_3$ in terms of higher aromatic and lower coke yield. The activity differences are quite significant taking into account the relative chromium contents.

The final entry in Table II shows that potassium carbonate neutralization further improves the performance of the potassium nitrate promoted catalyst. Coke formation is significantly reduced with the neutralized catalyst relative to the nitrate impregnated catalyst. Furthermore, higher aromatics formation resulted even though the concentration of chromium was lower by about 50%. These data show that postimpregnation neutralization with carbonate is clearly beneficial and distinct from traditional impregnation with potassium nitrate.

In contrast to the data given, it is known that a chlorided commercial platinum-rhenium catalyst (Pt—Re—$Al_2O_3$—Cl) performs poorly under these conditions of heptene reforming. Large gas yields and rapid activity loss result with this catalyst. At 0.5 W/H/W heptene space velocity, toluene yield starts at 61% but decreases to 15% by two hours. Cracked products ($C_6^-$) comprise 35% of the product compared to 2% with the promoted chromia catalysts. These results emphasize the remarkable ability of the new promoted chromia catalysts under severe, deactivating conditions.

The following additional data given in Table III show the results obtained by the use of a molybdena-alumina catalyst used in reforming heptene under similar conditions. These data are also compared with results obtained with two commercial catalysts; one a molybdenaalumina catalyst, and the other a platinum-rhenium (Pt-Re) catalyst. Both of these catalysts were found to have inferior performance compared to the $Na_2CO_3$ treated molybdena catalyst of this invention. High gas and coke yields and very poor stability characterize these commercial catalysts under these conditions of heptene reforming. The catalyst of this invention as shown, promoted the aromatization of heptene to toluene and greatly decreased cracking to light ends ($C_6^-$). Coke was appreciably lowered and as a result the catalyst showed improved stability.

TABLE III

HEPTENE REFORMING
1 Atm. 930° F. 5.0 W/H/W N$_2$/Oil 37

| Catalyst* | Wt. % C$_6^-$ @ 5 Mins. | Wt. % Toluene Yield 5 Min. | 1 hr. | 2 hr. | 4 hr. | Wt. % Coke (Time Hrs.) |
|---|---|---|---|---|---|---|
| A Mo—Na$_2$CO$_3$ | 2.0 | 31 | 48 | 45 | 35 | 4.96(5.5) |
| B Mo | 35.6 | 31 | 21 | 18 | 14 | 13.53(5.4) |
| C Mo | 10.8 | 76 | 35 | 23 | 13 | 17.55(4.6) |
| D Pt—Re | 33.0 | 61 | 20 | 15 | — | 3.48(3.3) |

*Catalyst Description:
A 3.8% Mo, 1.37% S, 0.83% Na - Na$_2$CO$_3$ treated catalyst of this invention.
B 5% Mo, 1.6% S.
C 7% Mo - commercial catalyst.
D 0.3% Pt, 0.3% Re, 0.14% S, 1.0% Cl - commercial catalyst.

Any type of conventional pre-treatment such as calcining, sulfiding, and reduction can be used before and/or after alkali treatment. The catalyts of this invention are useful for reforming in the presence or absence of hydrogen, and they are particularly suited to use in a fluid bed or magnetically stabilized fluid bed process. In addition to aromatization, they are useful for catalyzing dehydrogenation reactions.

It is apparent that various modifications and changes can be made without departing the spirit and scope of the present invention.

Having described the invention, what is claimed is:

1. In a process for reforming an olefinic, nitrogen and sulfur containing hydrocarbon feed by contact thereof with a dried, calcined catalyst comprised of from about 0.1 to about 20 percent of a Group VI-B metal component composited with an inorganic oxide support, the improvement comprising contacting and post-treating said dried, calcined catalyst composite with a solution of an alkali or alkaline-earth metal compound, incorporating from about 0.1 percent to about 4 percent of an alkali or alkaline-earth metal substantially entirely upon the surface of said catalyst composite sufficient to neutralize the Bronsted acidity of said catalyst composite, again drying, and again calcining said neutralized catalyst composite, and then contacting said hydrocarbon feed with said dried, calcined, post-neutralized catalyst composite.

2. The process of claim 1 wherein the inorganic oxide support is alumina.

3. The process of claim 1 wherein the incorporated alkali or alkaline-earth metal component ranges from about 0.1 percent to about 2 percent.

4. The process of claim 1 wherein the catalyst composite is contacted and treated with an aqueous solution of a Group I-A or Group II-A metal carbonate, bicarbonate, or hydroxide.

5. The process of claim 1 wherein the dried, calcined, neutralized catalyst composite is reduced by contact with hydrogen prior to contact with said hydrocarbon feed.

6. The process of claim 1 wherein the catalyst contains from about 1 percent to about 10 percent of the Group VI-B metal.

7. The process of claim 1 wherein the catalyst contains from about 0.1 percent to about 4 percent of the alkali or alkaline earth metal.

8. The process of claim 1 wherein the catalyst contains from about 1 percent to about 10 percent of the Group VI-B metal, and from about 0.1 to about 4 percent of the alkali or alkaline-earth metal.

9. The process of claim 1 wherein the Group VI-B metal is chromium or molybdenum.

10. The process of claim 1 wherein the alkali or alkaline-earth metal is an alkali metal characterized as potassium, sodium or cesium.

11. The process of claim 1 wherein the catalyst is sulfided, and contains to about 7 percent sulfur.

12. The process of claim 11 wherein the catalyst contains from about 0.05 percent to about 2 percent sulfur.

* * * * *